(12) United States Patent
Semenenko

(10) Patent No.: US 6,199,606 B1
(45) Date of Patent: *Mar. 13, 2001

(54) MATERIAL HANDLING APPARATUS

(75) Inventor: Ivan Semenenko, Moreton-in-Marsh (GB)

(73) Assignee: Matcon (R&D) Limited, Gloucestershire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,246
(22) PCT Filed: Jul. 5, 1996
(86) PCT No.: PCT/GE96/01632
    § 371 Date: Jul. 16, 1998
    § 102(e) Date: Jul. 16, 1998
(87) PCT Pub. No.: WO97/05050
    PCT Pub. Date: Feb. 13, 1997

(30) Foreign Application Priority Data

Jul. 29, 1995 (GB) .................................. 9515256

(51) Int. Cl.$^7$ ...................................... B65B 1/04
(52) U.S. Cl. ................. 141/351; 141/312; 141/368; 220/281; 220/284
(58) Field of Search ..................... 141/347, 312, 141/252, 253, 356, 313, 357, 368, 351, 287, 98, 346; 53/381.1, 381.4; 215/301–304; 220/260, 262, 281, 284, 286

(56) References Cited

U.S. PATENT DOCUMENTS 5,351,864 * 10/1994 Semenenko et al. ................ 222/504
5,490,546 * 2/1996 Lhoest .................................. 141/346

* cited by examiner

Primary Examiner—Henry J. Reca
Assistant Examiner—Huyen Le
(74) Attorney, Agent, or Firm—Vorys, Sater, Seymour and Pease LLP

(57) ABSTRACT

An apparatus for handling flowable material, particularly particulate material, which is held in a discharge container such as an IBC having an opening normally covered by a transport cap, comprises a device which is adapted to engage and remove the transport cap and a device to cover at least a rim of the cap during such removal. The problem of contamination is overcome using the apparatus which is in the form of an annular metal (in the embodiment) cowl which has two peripheral spaced apart upstanding walls, the inner wall rising from an internal base in the embodiment and from which also rises the engaging and removing device, which in the embodiment shown comprises a pneumatic piston and cylinder arrangement. The piston carries an extractor in the form of an annular disc or spider having a depending peripheral wall which carries an inflatable ring or tire. The external surface of the inner wall carries at its rim a lip seal which is mounted over an inflatable ring. The outer wall is higher than the inner wall, and carries an annular seal too, which extends over the lip seal.

21 Claims, 4 Drawing Sheets

MATERIAL HANDLING APPARATUS

BACKGROUND OF THE INVENTION

The invention relates to material handling apparatus, particularly flowable material such as a powder. It will be understood that the expression particulate material used herein includes powders, grains, granules, dust, tablets, capsules, and the like.

It is often the case that such particulate material—usually held in a container such as an intermediate bulk container (IBC) for transport, storage and general handling—has to be contained in the immediate area of the IBC during discharge through a discharge station to subsequent processing. Such containment is for environmental purposes and/or for the health of operating personnel. Such problems have to a large extent been obviated, for example as shown in U.K. patent specification No. 2084969.

However, required standards for containment are constantly increasing in industries such as those concerned, with pharmaceutical, fine chemicals, or radio-active materials and indeed anywhere where product contamination of atmosphere or personnel is an important factor.

Present day O.E.L. (operator exposure levels) typically are between $1\times10^{-3}$ and $1\times10^{-5}$ grammes per cubic meter of air. These levels are no longer sufficient to meet the needs of industry and O.E.L. levels down to $1\times10^{-9}$ grammes per cubic meter (1 nanogramme per cubic meter) are now required. The only present practical ways to achieve such levels are by use of laboratory scale equipment using glove boxes, full operating protection, breathing apparatus, full environmental air cleaning and conditioning and so on. The problem is that laboratory methods can only process such products in very small quantities whereas industrial process industries require to process and action these toxic materials in large batch quantities in the hundreds and thousands of Kgs. Such prior processes are expensive, time-consuming and impractical for large volumes, particularly as no prior system today is capable of meeting containment O.E.L. levels of $1\times10^{-9}$ grammes per cubic meter.

The problem is that generally an IBC when removed from a discharge station even with a double lip seal and intermediate cleaning system will still have some amount of product on the bottom exposed edge of a cone valve seal and bin outlet of the system.

There is an item, a transport cap, which is fitted manually or automatically to the outlet to cover these contaminated areas completely and thus to enable the IBC to be moved away with no product exposed, a system incorporating such a cap being now able to achieve higher levels of product containment.

However, between the time that the IBC is lifted up from the discharge station and the transport cap being fitted, product is exposed to the local environment and there is a risk that while the transport cap is being moved horizontally sideways underneath the IBC (between the IBC and the discharge station), and then upwards to engage, some minute particles of product will fall off the edge of the cone valve and bin outlet and contaminate the outer surfaces of the transport cap—(it being accepted that when the transport cap has been moved horizontally into position and lifted upwards the inner surfaces of the transport cap and the exposed surfaces of the cone valve mate and seal together thus protecting these product contaminated surfaces from the outside and vice versa).

SUMMARY OF THE INVENTION

It is therefore an object of the invention to seek to mitigate the disadvantages referred to hereinbefore, and to seek to ensure that contamination of the outside of the transport cap is substantially obviated.

According to a first aspect of the invention, there is provided apparatus for handling flowable material, particularly particulate material, which is held in a container having a discharge opening normally covered by a transport cap, the apparatus comprising a device which is adapted to engage and remove the transport cap and means to cover at least a rim of the transport cap during such removal.

The apparatus may comprise an annular member, the device being substantially centrally arranged, and the cover preferably being substantially peripherally arranged. This provides a relatively simple way of covering a transport cap.

The cover may comprise a substantially annular lip seal. This provides for substantially complete containment over the whole peripheral edge of the cap in use.

The lip seal may have a relaxed sealing mode, and the apparatus may comprise means to actuate the lip seal into a non-sealing mode. This enables ease of operation and installation.

The actuating means of the lip seal may comprise an expansible ring internally of part of the lip seal, the arrangement being such that on expansion of the ring the lip seal may be drawn back to a non-sealing mode. This provides a relatively efficient yet simple operation.

The apparatus may have two spaced peripheral walls, and the lip seal and actuating means may be carried externally of the inner wall. This provides a relatively easily manufactured apparatus.

The outer wall may be higher than the inner wall and may terminate in an inwardly directed cover part overlying and spaced from the lip seal whereby to provide an annular space. This annular space may comprise a sweep area for gas, e.g. air, cleaning.

The device for engaging and removing the cap may comprise a reciprocable actuating arrangement which may carry an extractor device for engaging the cap. This again provides a relatively simple construction, particularly when the reciprocable actuating arrangement may comprise a piston and cylinder arrangement carried by the apparatus.

The piston and cylinder arrangement may be mounted substantially centrally of the apparatus and may comprise a pneumatically operable piston and cylinder arrangement. This can be actuated by the air system of a discharge station.

The extractor device may be mounted on the piston for reciprocation therewith. This provides adequate control.

The extractor device may comprise an inflatable device which on expansion may contact and grip an internal surface of the transport cap. This provides for positive action.

The inflatable device may comprise a pneumatic device, suitably an inflatable ring.

The apparatus may have a support means. This provides for ease of mounting at a discharge station.

The support means may comprise an arm mounted for rotation whereby the arm is operable to move the apparatus to address a transport cap. This provides for ease of removal of a transport cap.

The arm may carry service lines of the apparatus. This provides for a saving of space.

The service lines may comprise an air line or lines. These may suitably be air lines of the discharge station.

According to a second aspect of the invention, there is provided a discharge station for discharging flowable particulate material from a container therefor, comprising apparatus as hereinbefore defined.

There may also be a station for cleaning the apparatus.

The cleaning station may comprise an air cleaning station.

According to a third aspect of the invention there is provided a material handling system including a wash station for washing the container, and the said station may include apparatus as hereinbefore defined.

BRIEF DESCRIPTION OF THE DRAWINGS

Apparatus and a system incorporating same are hereinafter described, by way of example, with reference to the accompanying diagrammatic drawings.

DETAILED DESCRIPTION OF THE INVENTION

Figure 1:
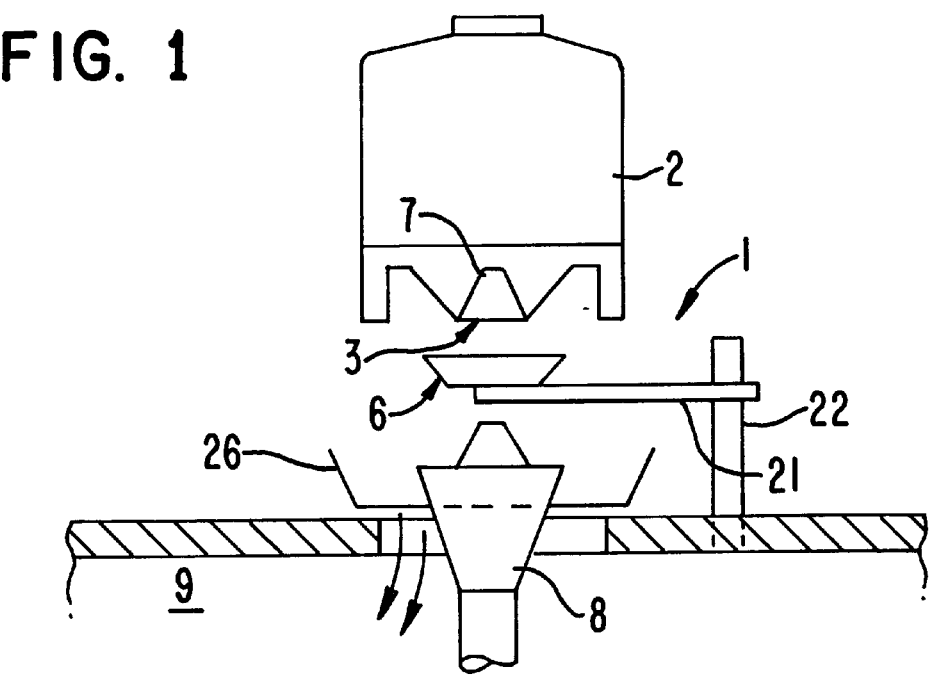
FIG. 1 shows schematically a discharge station incorporating apparatus according to the invention.
Figure 2:
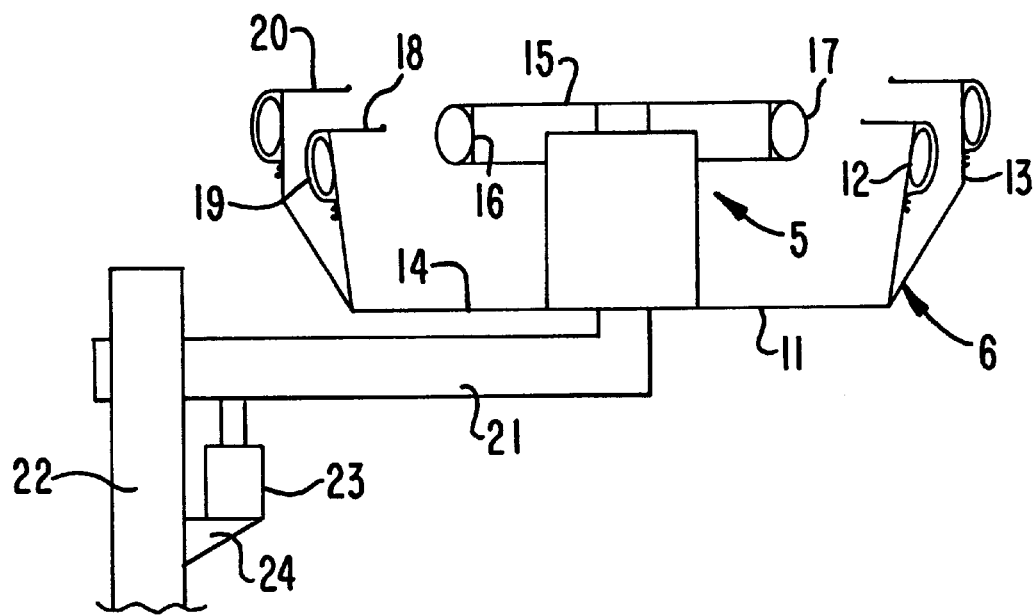
FIG. 2 shows to an enlarged scale apparatus according to the invention, taken on the line X—X of FIG. 3.

Referring to the drawings, there is shown apparatus 1 for handling flowable material, particularly particulate material, which is held in a discharge container such as an IBC 2 having an opening 3 normally covered by a transport cap 4, the apparatus 1 comprising a device 5 which is adapted to engage and remove the transport cap 4 and means 6 to cover at least a rim of the cap 4 during such removal.

The particulate material, which may be a pharmaceutical product, fine chemical product, radioactive material or any other material which can contaminate its surroundings, is held in the intermediate bulk container 2 (IBC) for storage, transport and general handling prior to passing to future processing. In order to pass the material to future processing, it is necessary to discharge it from the IBC, through the discharge opening 3 thereof. The discharge opening 3 is usually obturated by a closure device such as a valve 7 of conical or frustoconical form which, to obturate the opening 3, sits down on the internal hopper surface of the IBC leading to the outlet 3, and which valve is raised by a lifting device 8 at the discharge station 9 to open an annular gap defined by the valve and hopper surface through which the material can flow. During transport, it is important that the valve does not become dislodged and accordingly the valve is held in place by the transport cap 4 which can be manually or automatically applied to the edge of the hopper surface and which is inserted in the discharge opening to grip the inside of the valve from the inside.

There are various seal arrangements 10 to ensure that as much material as possible is maintained within the IBC or at the outlet and does not contaminate the external surfaces defining the discharge opening 3, the cap 4 or the seals 10 themselves as well as ensuring that the material itself is not contaminated by extraneous material. Such seal systems are disclosed in GB patent specification No. 2084959 or European Patent No. 0380255.

The transport cap 4 is usually moved into (or out of) position substantially horizontally (as viewed), and is then offered up to the discharge opening. In certain circumstances, however, a few particles of material may become adhered to the transport cap 4, and accordingly the problem of such contamination is overcome using the apparatus 1 shown, which is in the form of an annular metal (in the embodiment) cowl 11 which has two peripheral spaced apart upstanding walls 12, 13, the inner wall rising from an internal base 14 in the embodiment and from which also rises the engaging and removing device 5 which in the embodiment shown comprises a pneumatic piston and cylinder arrangement. The piston carries an extractor means in the form of an annular disc or spider 15 having a depending peripheral wall 16 which carries an inflatable ring or tire 17. The external surface of the inner wall 12 carries at its rim a lip seal 18 which is mounted over an inflatable ring 19. The outer wall 13 is higher than the inner wall 12, and carries an annular seal 20 too, which extends over the lip seal 18.

Figure 3:
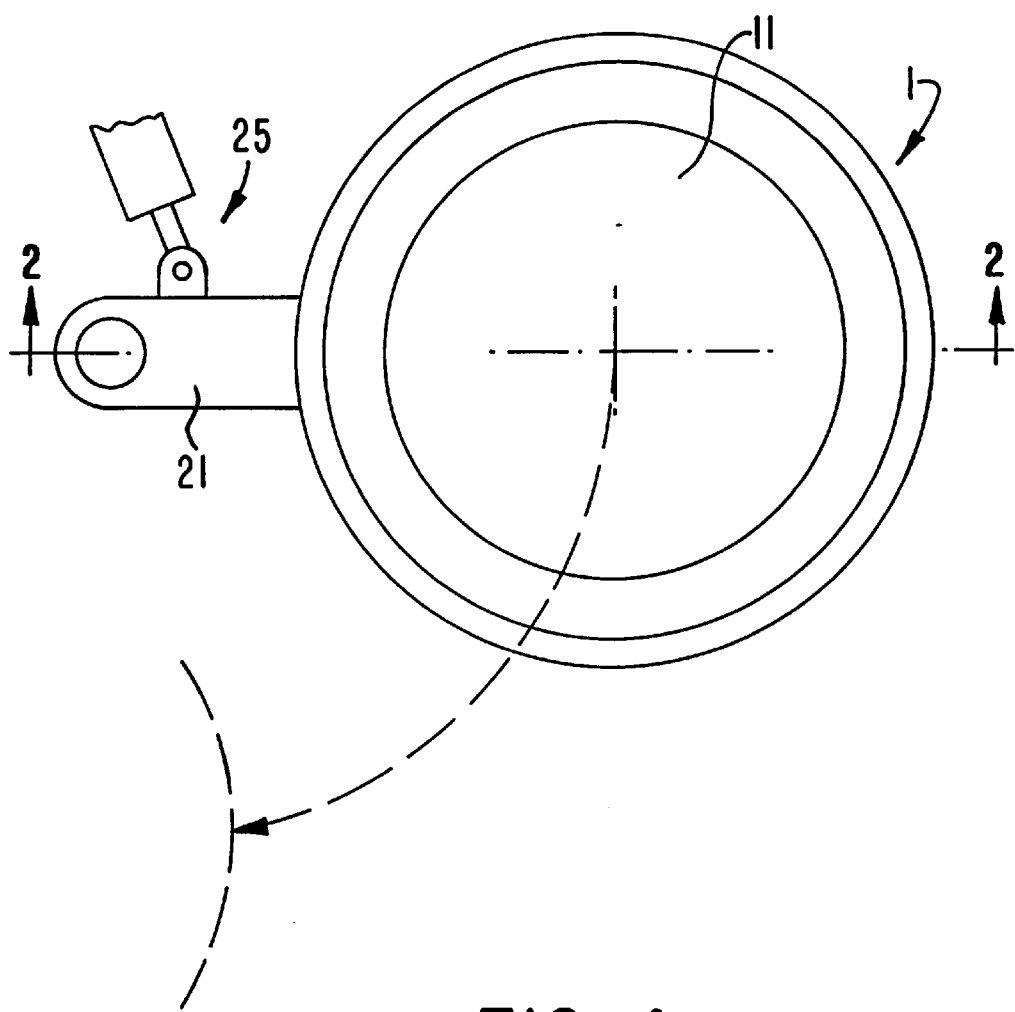
FIG. 3 shows a plan view of the apparatus of FIG. 2.
Figure 4:
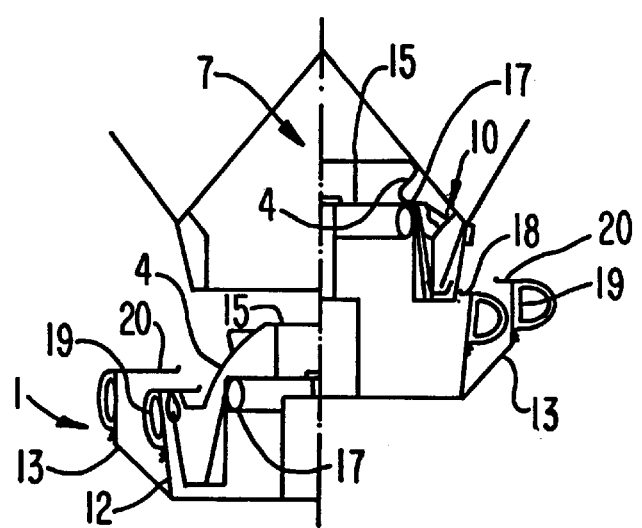
FIG. 4 shows a longitudinal sectional view of a slightly modified version of the apparatus of FIG. 2 in combination with a transport cap. The left hand side of the Figure shows the apparatus and transport cap still in position at an outlet of an IBC with the apparatus addressing same while the right hand side shows the apparatus engaged with the IBC.
Figure 5:
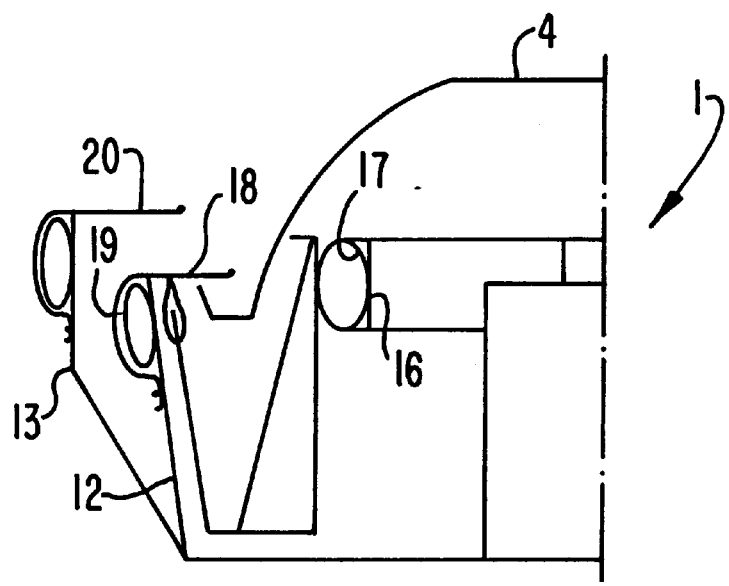
FIG. 5 shows a schematic view of part of the left hand side of FIG. 4.
Figure 6:
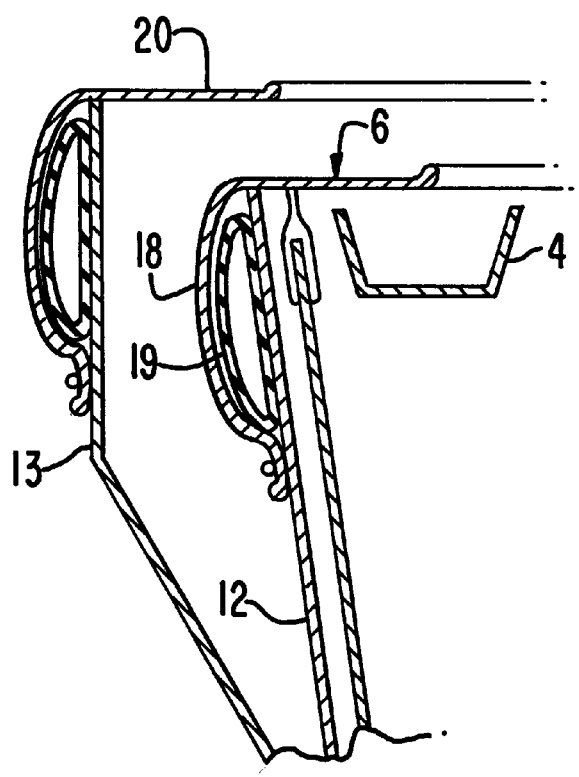
FIG. 6 shows an enlargement of part of FIG. 5.

The cowl 11 is mounted on a swingable or pivotable arm 21 which is pivotably mounted on an upstanding arm or pedestal 22. An actuator in the form of a piston and cylinder 23 for lifting the pivot arm 21 is mounted between that arm and a bracket 24 on the pedestal 22 and there is also an actuator 25 in the form of a piston and cylinder for swinging the cowl 11 between a parked position (shown in dashed lines in FIG. 3) and a position (shown in full lines in FIG. 3) below the IBC 2.

In use, at a discharge station 9 the IBC 2, filled with flowable particulate material, and with a transport cap 4 fitted, is brought by suitable means such as a forklift truck or other mechanical handling means over the discharge station 9, and is held some distance thereabove.

Figure 7:
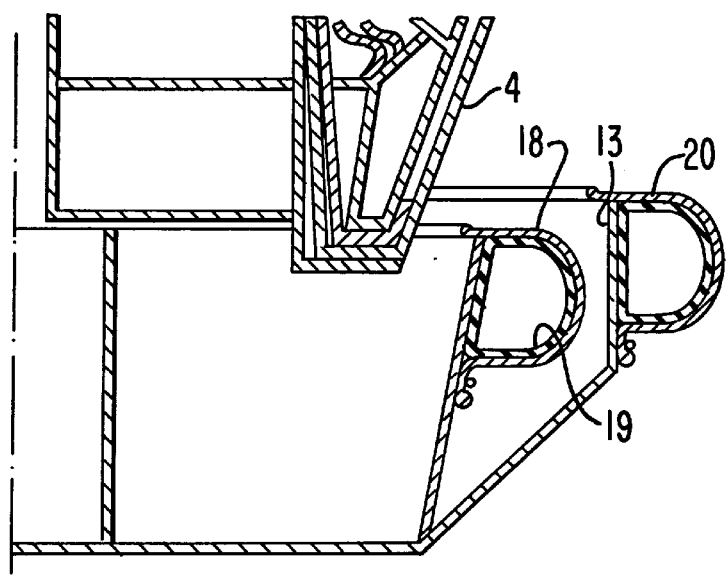
FIG. 7 shows a schematic view of part of the right hand side of FIG. 4.
Figure 8:
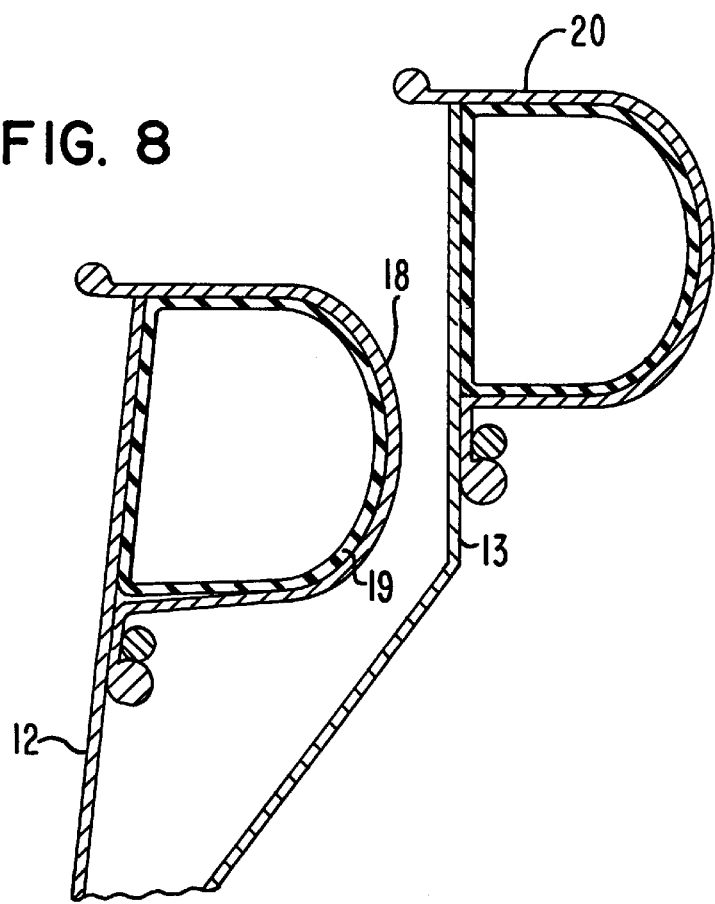
FIG. 8 shows an enlargement of part of FIG. 7.

The arm 21, actuated by the piston and cylinder 25, is pivoted horizontally so that the apparatus 1 is brought into position between the discharge outlet or opening of the IBC and the discharge station 9. During this action, the ring or tire 19 is inflated. This action draws the lip seal 18 back (FIGS. 7, 8) so that its free edge is adjacent the edge of the wall 12 and, moreover, is brought back so that it is clear of the largest diameter of the transport cap 4. In other words, the lip seal 18 clears the transport cap 4. The cowl 11 is then raised by raising the arm 21 via the piston and cylinder 23 until the piston and cylinder arrangement 5 in the centre of the cowl 11 is inside the transport cap 4. The annular ring or tire 17 carried by the spider 15 is now expanded by air flow down the air service lines in the arm 21 (as indeed was the ring or tire 19). The tire 17 has a large surface area on inflation which grips an inner surface of a wall of the transport cap 4. On lowering the piston 5, the transport cap 4 is drawn downwards and is thus released from the edge of the hopper outlet and from the valve. As the piston 5 is lowered by retraction into the cylinder, the transport cap 4 and the ring are lowered down inside the cowl 11.

The piston and cylinder arrangement 23 is now actuated to lower the whole combination of cowl 11 and transport cap 4. At the same time, the tire 19 is deflated, so that the lip seal 18 relaxes inwards to its natural, extended position and in doing so it covers the top edge and outer surfaces, including the rim thereof, of the transport cap 4. In this position, if there are any released or loose particles of material from the cone valve, they will deposit onto the lip seal 18 and/or they will be drawn into the annulus formed between the lip seal 18 and the seal 20 which annulus is an outer (as viewed) air sweep annulus as there may be provided means such as air inlet nozzles to ensure removal of product from the region of the transport cap. Thus no particulate material can contaminate the outside of the transport cap 4. These sequences of operations are shown in FIGS. 2 and 4 to 8.

The arm 21 is then actuated via the piston and cylinder 25 to swing the combination of cowl 11 and transport cap 4 to a separate enclosure (not shown) where air is admitted as a sweep to ensure that any particles of material on a top contaminated surface do not contaminate the local process environment or personnel.

The IBC is then lowered onto the discharge station 9 and material is discharged in the usual way. It will be understood that there may be a static outer air sweep cowl 26 around the discharge station 9 hopper to ensure that while the IBC 2 is being lowered, any particles of dust are contained within the air sweep area and are not admitted into the outer process area.

The IBC 2 is then raised, and the above-described process is reversed to re-engage the transport cap 4 via the cowl 11, thereby allowing the IBC 2 to be removed with no particulate material contaminating the outer surfaces of the transport cap and with the contaminated inner surfaces of the cone valve, hopper outlet and transport cap locked and sealed together.

The IBC may then be taken to a wash booth (not shown) where apparatus embodying the invention separate the transport cap and IBC, and internal jets wash all the inner and outer surfaces of the IBC before it is refilled, and the cycle repeated.

It will be understood that using apparatus embodying the invention as hereinbefore described in the drawings, it is possible to ensure that no particulate material contaminates the outer surface of the transport cap, contaminated inner surfaces of the valve 7, outlet and transport cap being locked and sealed together to achieve this desirable result.

What is claimed is:

1. Apparatus for handling flowable material, particularly particulate material which is held in a container having a discharge opening at the bottom thereof normally covered by a transport cap, said transport cap being removable from said discharge opening by a downward movement, said transport cap having a rim, said apparatus comprising:
   (i) a device which is adapted to engage and remove said transport cap from the container; and
   (ii) cover means to cover at least the rim of the transport cap during such removal, said cover means comprising a substantially annular lip seal movable transversely to the downward movement of the cap whereby the annular rim of the transport cap is covered by said seal during such removal.

2. Apparatus as defined in claim 1, wherein the cover means comprises an annular member, and wherein the device is substantially centrally arranged with respect to the annular member and the annular member is substantially peripherally arranged with respect to the device.

3. Apparatus as defined in claim 1, wherein the lip seal has a relaxed sealing mode, and wherein the apparatus comprises means to actuate the lip seal into a non-sealing mode.

4. Apparatus as defined in claim 3, wherein the actuating means of the lip seal comprises an expansible ring internally of part of said lip seal, whereby on expansion of the ring, the lip seal is drawn back to a non-sealing mode.

5. Apparatus as defined in claim 3, wherein the cover means comprises two spaced peripheral walls, and wherein the lip seal and actuating means are carried externally of the inner wall.

6. Apparatus as defined in claim 3, wherein cover means comprising two spaced peripheral walls, the outer wall of said two walls being higher than the inner wall and terminating in an inwardly directed cover part overlying and spaced from the lip seal whereby to provide an annular space.

7. Apparatus as defined in claim 1, wherein the device for engaging and removing the cap comprises a reciprocable actuating arrangement which carries an extractor device for engaging the cap.

8. Apparatus as defined in claim 7, wherein the reciprocable actuating arrangement comprises a piston and cylinder arrangement carried by the apparatus.

9. Apparatus as defined in claim 8, wherein the piston and cylinder arrangement is mounted substantially centrally of the apparatus and comprises a pneumatically operable piston and cylinder arrangement.

10. Apparatus as defined in claim 8, wherein the extractor device is mounted on the piston for reciprocation therewith.

11. Apparatus as defined in claim 8, wherein the extractor device comprises an inflatable device whereby the internal surface of the transport cap is gripped on expansion of the inflatable device.

12. Apparatus as defined in claim 11, wherein the inflatable device comprises a pneumatic device.

13. Apparatus as defined in claim 11, wherein the inflatable device comprises an inflatable ring.

14. Apparatus as defined in claim 1, wherein there is a support means for the apparatus.

15. Apparatus as defined in claim 14, wherein the support means comprises an arm mounted for rotation whereby the arm is operable to move the apparatus to address a transport cap.

16. Apparatus as defined in claim 15, wherein the arm caries service lines of the apparatus.

17. Apparatus as defined in claim 15, wherein the arm carries an air service.

18. A discharge station for discharging flowable particulate material from a container therefor, wherein there is apparatus as defined in claim 1.

19. A discharge station as defined in claim 18, wherein there is additionally a station for cleaning the apparatus.

20. A discharge station as defined in claim 19, wherein the cleaning station comprises an air cleaning station.

21. A material handling system, wherein there is a discharge station according to claim 18.

\* \* \* \* \*